United States Patent
Pagani

(10) Patent No.: US 9,514,879 B2
(45) Date of Patent: Dec. 6, 2016

(54) SIGNAL TRANSMISSION THROUGH LC RESONANT CIRCUITS

(71) Applicant: STMICROELECTRONICS S.r.l., Agrate Brianza (IT)

(72) Inventor: Alberto Pagani, Nova Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/479,089

(22) Filed: Sep. 5, 2014

(65) Prior Publication Data
US 2014/0375398 A1 Dec. 25, 2014

Related U.S. Application Data

(63) Continuation of application No. 12/907,812, filed on Oct. 19, 2010, now Pat. No. 8,902,016.

(30) Foreign Application Priority Data

Oct. 21, 2009 (IT) .............................. MI2009A1825

(51) Int. Cl.
H04B 5/04 (2006.01)
H04B 5/00 (2006.01)
(Continued)

(52) U.S. Cl.
CPC ............... H01F 38/14 (2013.01); H02J 17/00 (2013.01); H04B 5/0012 (2013.01);
(Continued)

(58) Field of Classification Search
CPC .................................. H01P 5/04; H01P 1/203
(Continued)

(56) References Cited

U.S. PATENT DOCUMENTS 5,057,847 A * 10/1991 Vaisanen ................. H03H 7/38
333/24 C
5,072,176 A 12/1991 Miller et al.
(Continued)

FOREIGN PATENT DOCUMENTS

EP 2086052 8/2009
JP 2007-165459 A 6/2007

OTHER PUBLICATIONS

Search Report based on Italian application Serial No. MI20091825, Ministero dello Sviluppo Economico, Munich, May 17, 2010, pp. 3.
(Continued)

Primary Examiner — Dean Takaoka
(74) Attorney, Agent, or Firm — Seed IP Law Group LLP

(57) ABSTRACT

An embodiment of an electronic system includes a first electronic circuit and a second electronic circuit. The electronic system further includes a resonant LC circuit having a resonance frequency for coupling the first electronic circuit and the second electronic circuit; each electronic circuit includes functional means for providing a signal at the resonance frequency to be transmitted to the other electronic circuit through the LC circuit and/or for receiving the signal from the other electronic circuit. The LC circuit also include capacitor means having at least one first capacitor plate included in the first electronic circuit and at least one second capacitor plate included in the second electronic circuit. The LC circuit further includes first inductor means included in the first electronic circuit and/or second inductor means included in the second electronic circuit. The at least one capacitor plate of each electronic circuit is coupled with the corresponding functional means through the possible corresponding inductor means.

15 Claims, 11 Drawing Sheets

(51) Int. Cl.
*H01F 38/14* (2006.01)
*H02J 17/00* (2006.01)
*H01P 5/00* (2006.01)

(52) U.S. Cl.
CPC ......... *H04B 5/0037* (2013.01); *H04B 5/0075* (2013.01); *H04B 5/0093* (2013.01); *H01F 2038/146* (2013.01)

(58) Field of Classification Search
USPC ............................. 333/24 R, 24 C; 343/713
See application file for complete search history.

(56) References Cited

U.S. PATENT DOCUMENTS

| | | | |
|---|---|---|---|
| 5,302,557 A | 4/1994 | Carroll et al. | |
| 5,557,290 A | 9/1996 | Watanabe | |
| 5,565,877 A | 10/1996 | Du et al. | |
| 5,625,883 A | 4/1997 | Leyten et al. | |
| 5,926,358 A | 7/1999 | Dobkin et al. | |
| 6,538,609 B2* | 3/2003 | Nguyen | H01Q 1/1285 343/704 |
| 6,686,882 B2* | 2/2004 | Petros et al. | 343/700 MS |
| 7,046,027 B2 | 5/2006 | Conner | |
| 7,088,803 B2* | 8/2006 | Rahamim | H04M 11/066 379/90.01 |
| 7,302,247 B2* | 11/2007 | Dupuis | H04L 25/0266 455/280 |
| 7,919,909 B2 | 4/2011 | Sabah et al. | |
| 8,902,016 B2* | 12/2014 | Pagani | H04B 5/0012 333/24 C |
| 2003/0107387 A1 | 6/2003 | Williams et al. | |
| 2005/0038613 A1 | 2/2005 | Yamaoka | |
| 2005/0046428 A1 | 3/2005 | Tesdahl et al. | |
| 2005/0225341 A1 | 10/2005 | Byrd | |
| 2006/0082358 A1 | 4/2006 | Conner | |
| 2006/0109015 A1 | 5/2006 | Thacker et al. | |
| 2006/0164114 A1 | 7/2006 | Cirkel et al. | |
| 2006/0273809 A1 | 12/2006 | Miller et al. | |
| 2007/0296435 A1 | 12/2007 | Eldridge et al. | |
| 2008/0017856 A1 | 1/2008 | Fujino | |
| 2008/0111572 A1 | 5/2008 | Kister | |
| 2009/0027243 A1* | 1/2009 | Leung | H01L 23/48 341/100 |
| 2009/0045828 A1 | 2/2009 | Chen et al. | |
| 2009/0073070 A1 | 3/2009 | Rofougaran | |
| 2009/0085696 A1 | 4/2009 | Abdul-Gaffoor et al. | |
| 2011/0089962 A1 | 4/2011 | Pagani | |
| 2011/0090030 A1 | 4/2011 | Pagani | |
| 2011/0279137 A1 | 11/2011 | Pagani | |

OTHER PUBLICATIONS

Search Report for Italian Application No. MI20091826, Ministero dello Sviluppo Economico, Munich, Aug. 23, 2010, pp. 2.

* cited by examiner

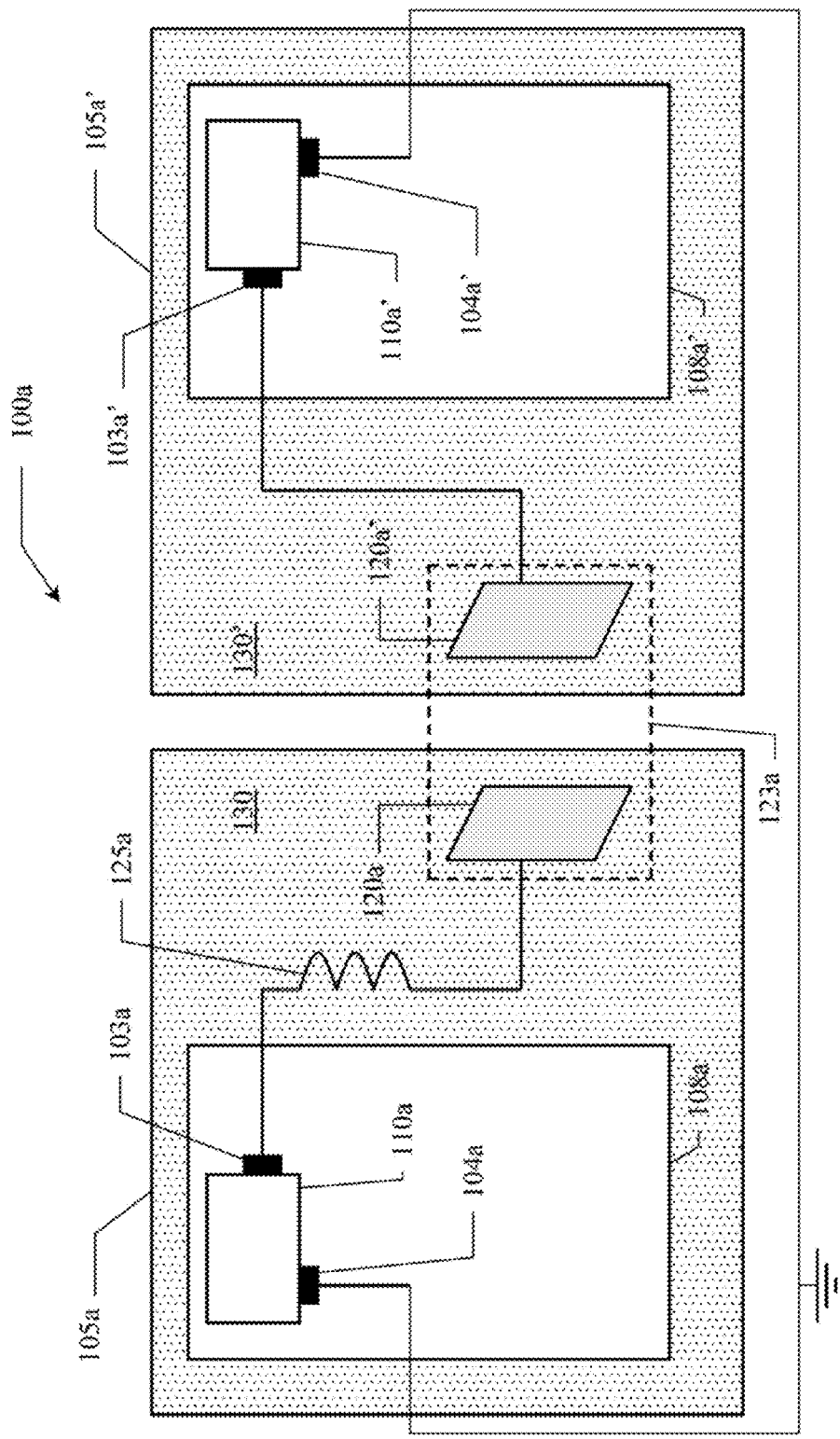

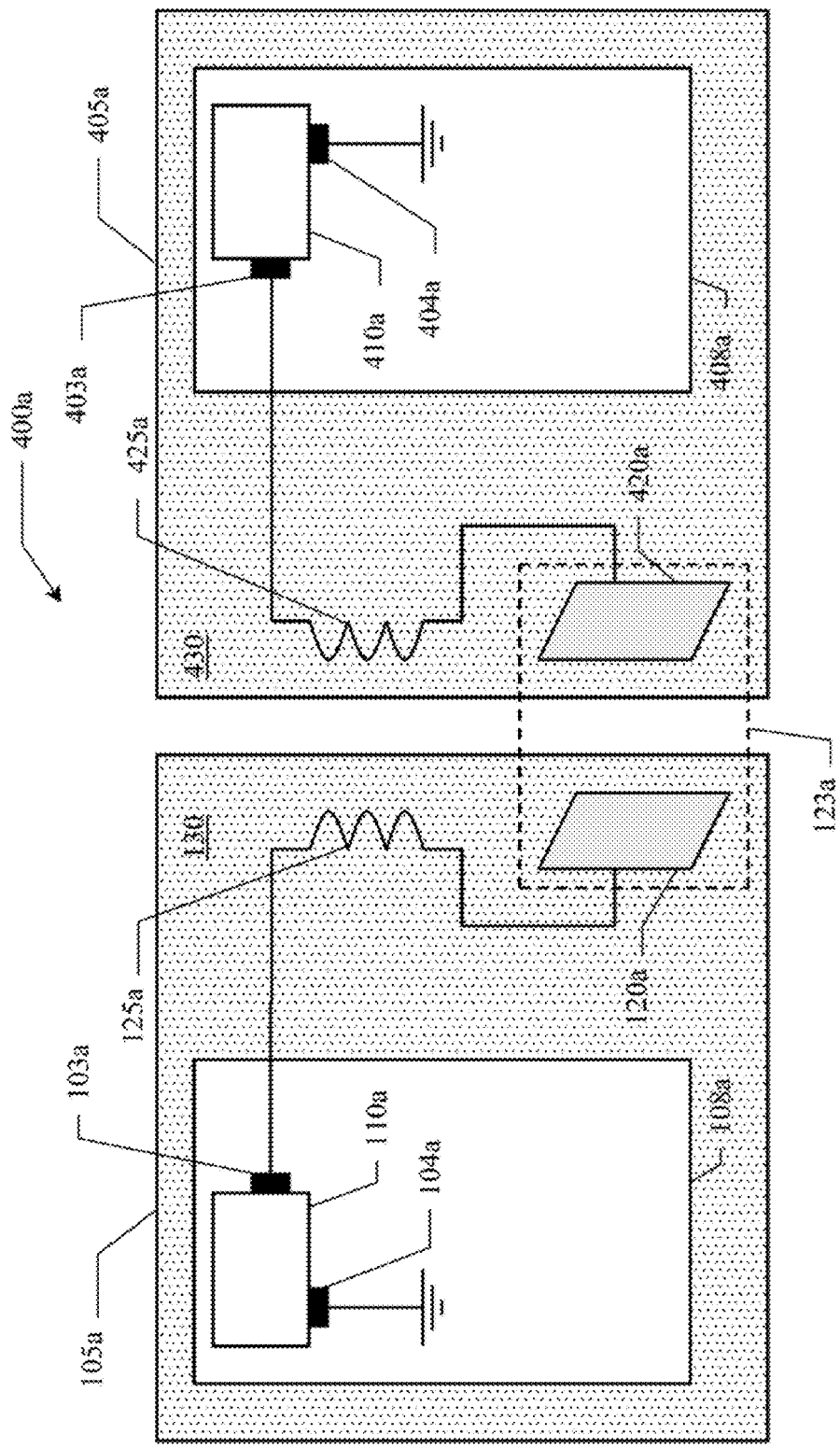

SIGNAL TRANSMISSION THROUGH LC RESONANT CIRCUITS

PRIORITY CLAIM

The present application is a Continuation of copending U.S. patent application Ser. No. 12/907,812, filed Oct. 19, 2010; which application claims the benefit of Italian Patent Application No. MI2009A001825, filed Oct. 21, 2009; all of the foregoing applications are incorporated herein by reference in their entireties.

RELATED APPLICATION DATA

This application is related to U.S. patent application Ser. No. 12/907,839, entitled "TESTING OF ELECTRONIC DEVICES THROUGH CAPACITIVE INTERFACE", filed Oct. 19, 2010, and which is incorporated herein by reference in its entirety.

TECHNICAL FIELD

One or more embodiments generally relate to the field of electronics. More specifically, such embodiments relate to the field of wireless transmission of signals and/or power among electronic circuits.

BACKGROUND

An electronic system may be formed by a plurality of electronic circuits, each one being capable of performing a specific function of the system. Among the design issues that are encountered in the development of an electronic system, one of particular relevance is given by the coupling among the electronic circuits thereof.

In a solution being known in the state of the art and commonly used for a large number of electronic systems available in the market, the coupling among the electronic circuits is performed through electrical connections. For example, such electrical connections may be implemented by interconnection metal tracks being arranged on an insulating support that is shared among the electronic circuits.

However, such interconnection tracks are subject to parasitic effects (for example, resistive, inductive and capacitive ones) that limit the maximum frequency of the signals (thereby affecting the speed of communication and execution of the operations) and that may imply unwanted power dissipation.

A known solution of the above-mentioned drawbacks provides for the coupling among the electronic circuits through electromagnetic waves. In order to transmit and/or receive the desired signals, the electronic circuits are provided with antennas. There exist solutions in which the antennas are of capacitive type; such capacitive antennas are devices that mainly use the electric field and, by means of electric induction, translate a voltage variation into an electromagnetic disturbance, and vice-versa, depending on whether they are used for transmission or reception. However, the capacitive antennas may be capable of only transmitting and receiving signals, but not a power supply. There also exist opposite solutions in which the antennas are of inductive type and they are included, for example, in parallel resonant LC circuits (that is, formed by an inductor and a capacitor being connected in parallel). Such inductive antennas mainly use the magnetic field and they are devices that, by means of magnetic induction, translate a current variation into an electromagnetic disturbance, and vice-versa, depending on whether they are used for transmission or reception.

However, such solutions may have some drawbacks that make them not always conveniently applicable in any electronic system. Particularly, the use of resonant LC circuits (for example, of parallel type) being embedded in the electronic circuits may occupy an excessive area, and this is often incompatible with the needs of reduced size.

Such drawback may be solved by implementing each inductive antenna in an upper area of the electronic circuit (without any increase in the area occupation of the electronic circuit). However, both in the case that the antenna is formed within the electronic circuit and in the case that the antenna is formed above it, the implementation of the coupling being based on inductive antennas substantially requires that each electronic circuit being part of the electronic system should be provided with at least one resonant LC circuit. This implies an increase in the number of required components and in the production costs.

SUMMARY

In its general terms, an embodiment is based on the idea of distributing the resonant LC circuits across different circuits.

More specifically, an embodiment is an electronic system including a first electronic circuit and a second electronic circuit. The electronic system further includes a resonant LC circuit having a resonance frequency for coupling the first electronic circuit and the second electronic circuit; each electronic circuit includes functional means for providing a signal at the resonance frequency to be transmitted to the other electronic circuit through the LC circuit and/or for receiving the signal from the other electronic circuit. An embodiment, the LC circuit includes capacitor means having at least one first capacitor plate included in the first electronic circuit and at least one second capacitor plate included in the second electronic circuit. The LC circuit further includes first inductor means included in the first electronic circuit and/or second inductor means included in the second electronic circuit. The at least one capacitor plate of each electronic circuit is coupled with the corresponding functional means through the possible corresponding inductor means.

Another embodiment is a corresponding transmission method.

The same features being recited in the dependent claims for the electronic system may apply mutatis mutandis to the method.

A further embodiment is an electronic circuit for use in such electronic system.

A different embodiment is a complex apparatus including one or more of such electronic systems.

BRIEF DESCRIPTION OF THE DRAWINGS

One or more embodiments, as well as further features and the advantages thereof, may be best understood with reference to the following detailed description, given purely by way of a non-restrictive indication, to be read in conjunction with the accompanying drawings (wherein corresponding elements are denoted with equal to similar references, and their explanation is not repeated for the sake of exposition brevity). In this respect, it is expressly intended that the figures are not necessarily drawn to scale and that, unless otherwise indicated, they are simply used to conceptually illustrate the described structures and procedures. In particular:

FIG. 1A schematically shows an electronic system according to an embodiment,

DETAILED DESCRIPTION

Figure 1B:
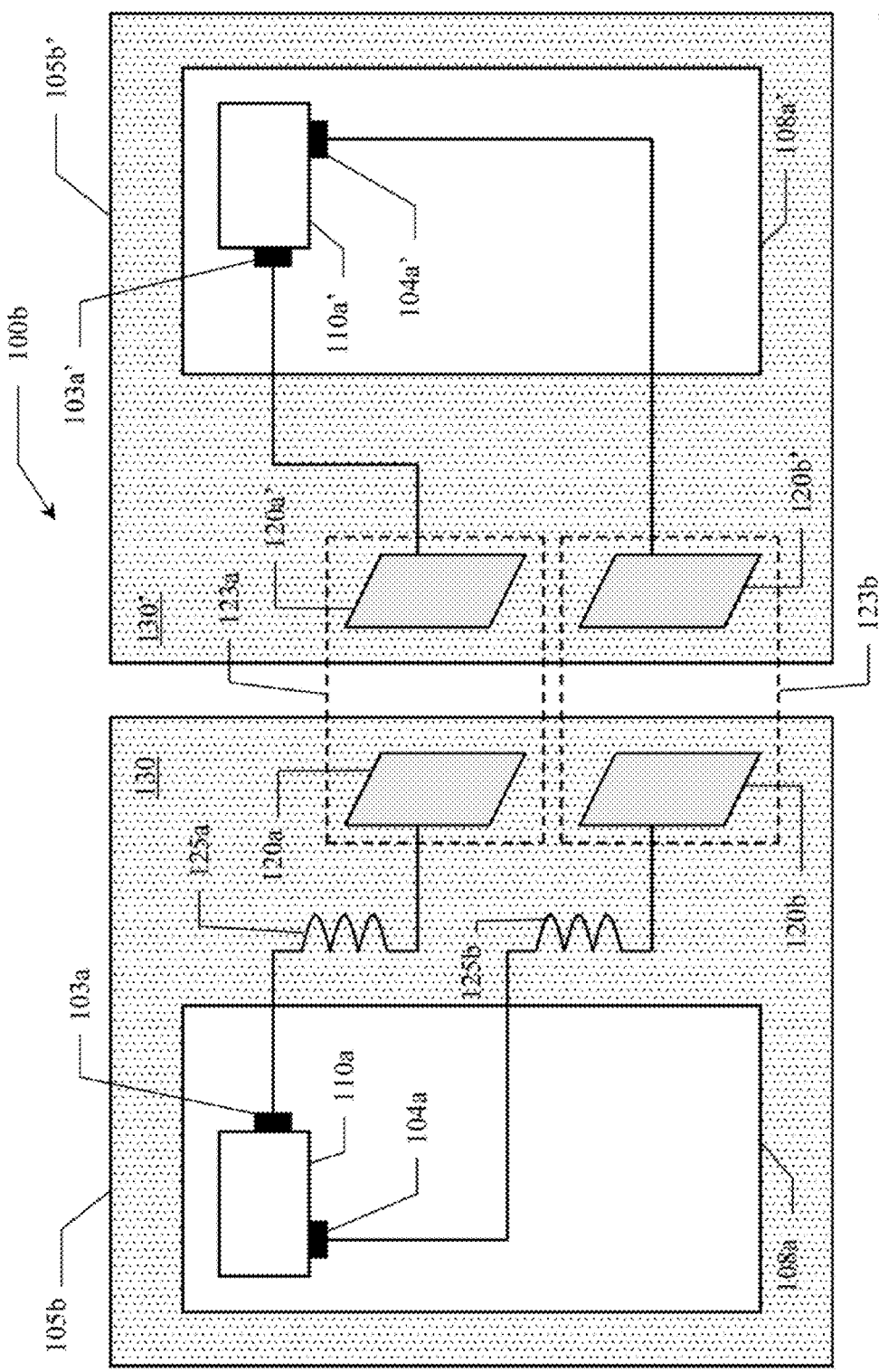
FIG. 1B schematically shows an electronic system according to another embodiment, FIG. 2A-2E schematically show different implementations of an electronic circuit according to corresponding embodiments, FIG. 2F schematically shows two electronic circuits in cross-section according to another embodiment, FIG. 3A schematically shows different implementations of an electronic circuit in top view according to corresponding embodiments, FIG. 3B schematically shows an implementation of an electronic circuit in cross-section according to another embodiment, FIG. 4A schematically shows an electronic system according to another embodiment, FIG. 4B schematically shows an electronic system according to a further embodiment, FIG. 5A schematically shows an implementation of the electronic system of FIG. 4A according to an embodiment, and FIG. 5B schematically shows an implementation of the electronic system of FIG. 4A according to another embodiment.

In particular, in FIG. 1A there is schematically shown an electronic system 100a exploiting wireless signal transmission according to an embodiment.

The electronic system 100a may include a plurality of electronic circuits; for the sake of description simplicity, there are considered, by way of example in no way limitative, a first electronic circuit 105a and a second electronic circuit 105a' of the electronic system 100a.

Each electronic circuit 105a, 105a' includes a corresponding functional region 108a, 108a'; the functional region 108a, 108a' is formed by circuit elements (not shown in the figure) implementing specific functions of the electronic circuit 105a, 105a' and by a transmission and/or reception block (for example, a transceiver, or alternatively a transponder) 110a, 110a' for managing signal transmissions and/or reception between the electronic circuits 105a and 105a', and vice-versa.

Such signals may be operative signals, which are used for transmitting a corresponding information content (for example, being properly encoded and modulated onto a carrier wave by any known communication technique).

In addition or in alternative, such signals may be supply signals, which consist of an alternate carrier wave that may be used for transmitting energy capable of supplying another system—for example, being used in reception for creating a direct voltage through an ACDC converter performing an operation of rectification, filtering, and possible regulation.

Each transceiver 110a, 110a' is provided with input/output terminals 103a, 103a' for receiving and/or transmitting such signals, and with a reference terminal 104a, 104a' for receiving a reference voltage. For example, the reference voltage may be a ground voltage (0 V), which may be provided through wired lines within all the electronic circuits of the electronic system 100a (as represented in the figure through lines being connected to the electrical symbol of the ground).

A metal plate 120a is formed in an area 130 being outside the functional region 108a of the electronic circuit 105a, while another metal plate 120a' is formed in an area 130' being outside the functional region 108a' of the electronic circuit 105a'.

Such metal plates 120a and 120a' are arranged in parallel being facing to each other at a suitable distance, so as to form a capacitor 123a having as dielectric medium, for example, the air being interposed between the electronic circuits 105a, 105a' (beyond any insulating protection layers thereof).

In the described exemplary embodiment, the area 130 of the electronic circuit 105a also includes an inductor 125a; the inductor 125a has a first terminal being coupled to a terminal 103a of the transceiver 110a and a second terminal being coupled with the metal plate 120a.

The metal plate 120a' of the electronic circuit 105a', instead, is directly coupled with the terminals 103a' of the transceiver 110a'.

In this way, the inductor 125a and the capacitor 123a form a series resonant LC circuit 125a, 123a; such LC circuit 125a, 123a has a resonance frequency (whose value depends on the size of the inductor 125a and of the capacitor 123a) at which ideally it behaves like a short circuit, so that each signal at the resonance frequency may be transmitted through it (from the transceiver 110a of the electronic circuit 105a to the transceiver 110a' of the electronic circuit 105a', and vice-versa), ideally without any loss.

An embodiment is advantageous since it does not require that each electronic circuit 105a, 105a' should be provided with a whole resonant LC circuit, with considerable saving in area occupation.

In fact, the corresponding inductor may be present in only one of the electronic circuits 105a, 105a' (such as for the inductor 125a of the electronic circuit 105a in the example at issue).

In any case, the capacitor 123a is distributed on the two electronic circuits 105a, 105a'; in particular, each electronic circuit 105a, 105a' includes one plate 120a, 120a' only of such capacitor 123a, while the respective dielectric medium is formed outside the electronic circuit 105a, 105a' (for example, through the air being interposed between them).

All of this may have a beneficial effect on the size of the electronic circuits 105a, 105a', and hence of the whole electronic system 100a.

In FIG. 1B there is schematically shown an electronic system 100b exploiting wireless signal transmission according to another embodiment.

The electronic system 100b includes two electronic circuits 105b and 105b' comprising the same components described above.

In such embodiment, in the area 130 of the electronic circuit 105b there is formed a further metal plate 120b, and in the area 130' of the electronic circuit 105b' there is formed a further metal plate 120b', which two plates form a further capacitor 123b.

The area 130 of the electronic circuit 105b includes a further inductor 125b; the inductor 125b has a first terminal being coupled with the reference terminal 104a of the transceiver 110a and a second terminal being coupled with the metal plate 120b.

The metal plate 120b', instead, is directly connected to the reference terminal 104a' of the transceiver 110a' of the electronic circuit 105b'.

As above, the inductor 125b and the capacitor 123b form a further series resonant LC circuit 125b, 123b.

The configuration thus obtained allows implementing a differential transmission of the signals between the electronic circuit 105b (at the terminals 103a and 104a) and the electronic circuit 105b' (at the terminals 103a' and 104a').

The implementations being depicted in FIG. 1A-1B may also benefit of manufacturing improvements for allowing an optimal management of the area occupation of the electronic circuits within the corresponding electronic system; for example, the inductors 125a, 125b may be distributed at least partly on several circuits.

FIG. 2A-2E schematically show electronic circuits with different implementations of the corresponding metal plates according to corresponding embodiments.

Figure 2A:
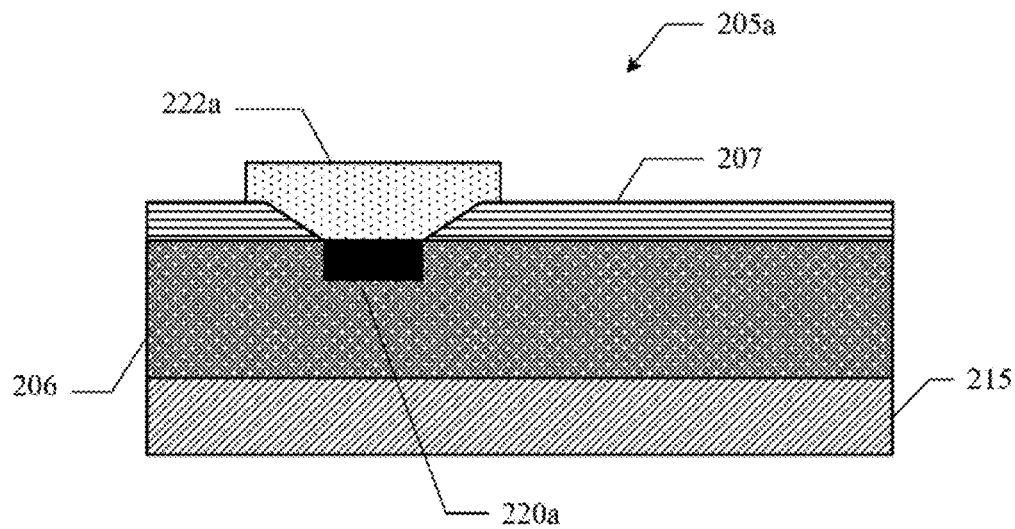

With particular reference to FIG. 2A, an electronic circuit 205a includes a functional substrate 206 being formed on a semiconductor substrate 215; the functional substrate 206 includes a plurality of active areas (not shown in the figure) being adapted to carry out specific functions of the electronic circuit 205a, and metal layers (not shown in the figure) for electrically connecting such active areas.

A passivation layer 207 is formed on the functional substrate 206 for preserving it from corrosion, contamination and actions of external substances.

The passivation layer 207, however, does not completely cover a last metal layer; the portions of the last metal layer being not covered by the passivation layer 207 form pads 220a (only one shown in the figure as a dark rectangle) for coupling the functional substrate 206 of the electronic circuit 205a with other electronic devices (not shown in the figure).

An embodiment provides that the pad 220a is used directly as metal plate.

Moreover, on the metal plate 220a there may be formed a layer of dielectric material 222a; in this way, it is possible to increase the value of the capacity of the corresponding capacitor (being obtained by approaching the other metal plate, not shown in the figure, to the layer of dielectric material 222a).

An embodiment is advantageous since it allows minimizing the additional operation being required for achieving the desired result.

Figure 2B:
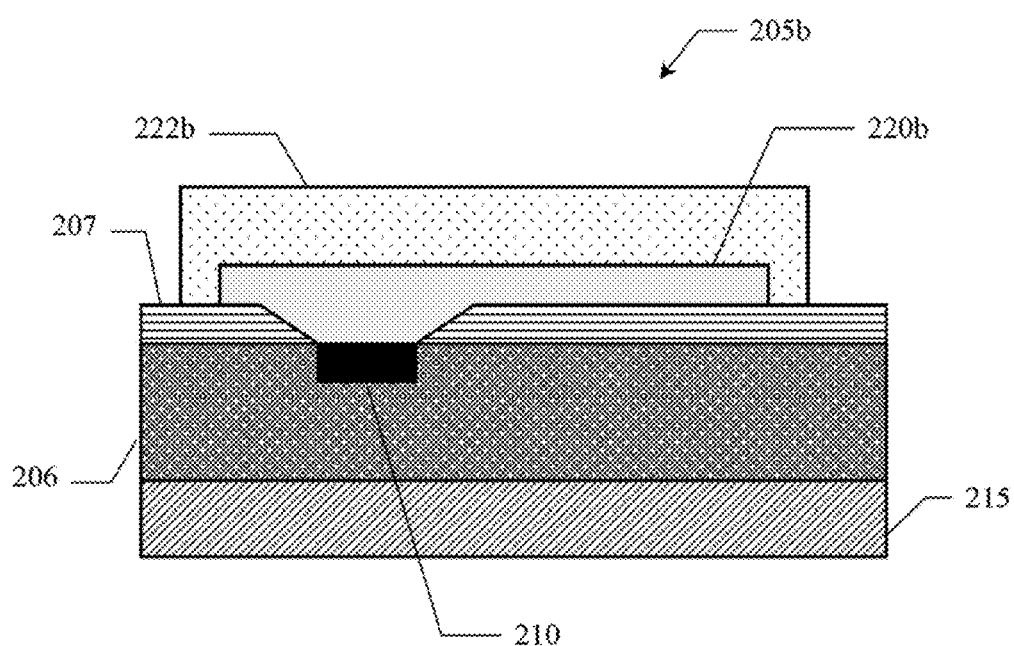

Turning now to FIG. 2B, an electronic circuit 205b has a similar structure to that shown in FIG. 2A.

In this case, a pad 210 is used for contacting the metal plate, which is formed by a substantially rectangular layer of metallic material 220b being deposited on the pad 210 and on a portion of the passivation layer 207 around the pad 210.

In this embodiment as well, it is possible to form a layer of dielectric material 222b on the metal plate 220b (obtaining the same or a similar advantage as described above).

An embodiment is advantageous since it is possible to increase the surface of the metal plate 220b, and thus the capacity of the capacitor, by using a pad 210 having reduced area.

Figure 2C:
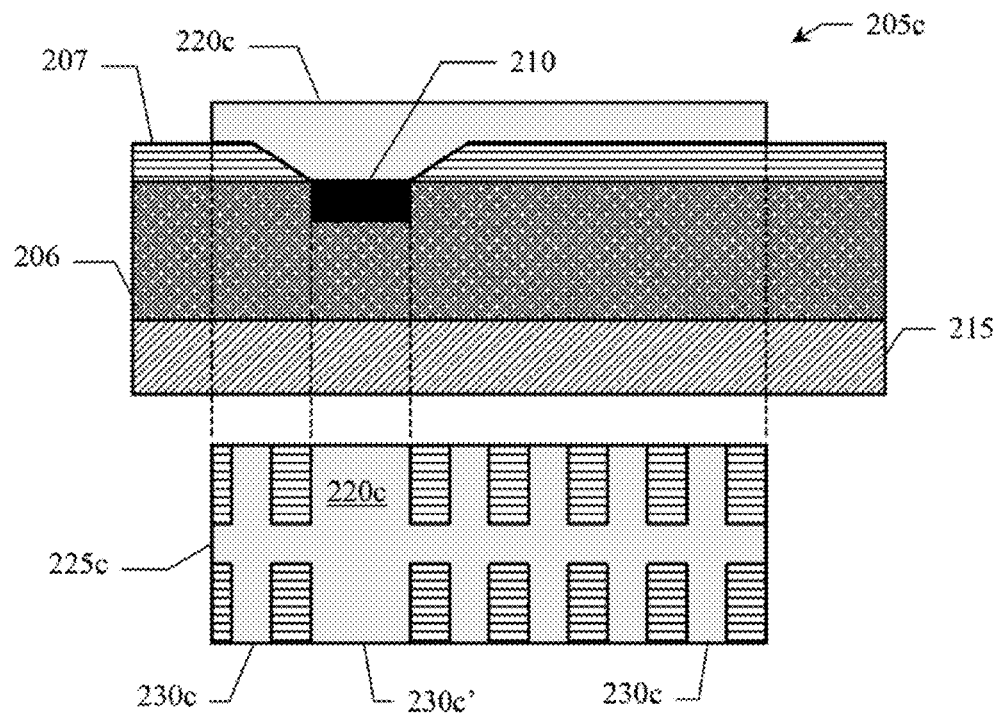

With reference now to FIG. 2C, an electronic circuit 205c has a similar structure to that shown in FIG. 2B (omitting the layer of dielectric material for the sake of simplicity), with the difference that a metal plate 220c having a herringbone structure (also called interdigitated) is formed on the pad 210 and on a portion of the passivation layer 207.

An example of part of the interdigitated structure of the metal plate 220c is shown in plan view in FIG. 2C below.

The metal plate 220c includes a longitudinal metal strip 225c; transversal metal strips 230c extend perpendicularly to the metal strip 225c (for example, at an equal distance at their sides); one of such transversal metal strips having a greater width (being differentiated through the reference 230c') contacts the pad 210.

An embodiment is advantageous since it allows using the metal plate 220c as a further means for wireless signal transmission; in fact, in particular conditions of charge migration within the metal plate 220c, this behaves as a set of Hertzian dipole antennas.

Figure 2D:
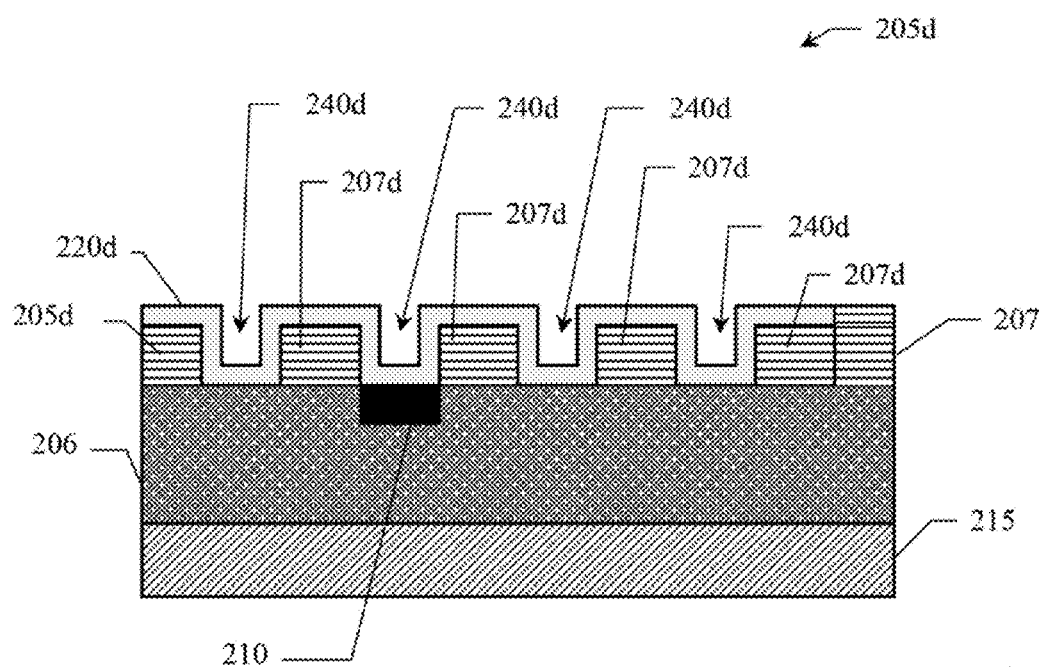

With reference now to FIG. 2D, an electronic circuit 205d again has a similar structure to that shown in FIG. 2B (omitting the layer of dielectric material for the sake of simplicity), with the difference that after having deposited the passivation layer 207, this is processed so as to remove it selectively (for example, through an etching process) in order to form a series of holes 240d (that leave exposed portions of an oxide layer, not shown in the figure, being placed on a surface area of the functional substrate 206).

Then, a metal plate 220d is formed on the pad 210, on a portion of the passivation layer 207d around the pad 210 (including the holes 240d) and on the portions of the oxide layer being exposed in such holes 240d, so as to obtain a non-planar structure (with depressions in correspondence to the holes 240d, which may also extend partly within the functional substrate 206).

An embodiment is advantageous since the shaped profile of the metal plate 220d allows implementing capacitors with capacity of higher value with respect to the previous embodiments, since this increases the area of the metal plate 220d but maintaining limited its encumbrance (and thus the size of the whole electronic circuit) in terms of occupied surface area.

Figure 2E:
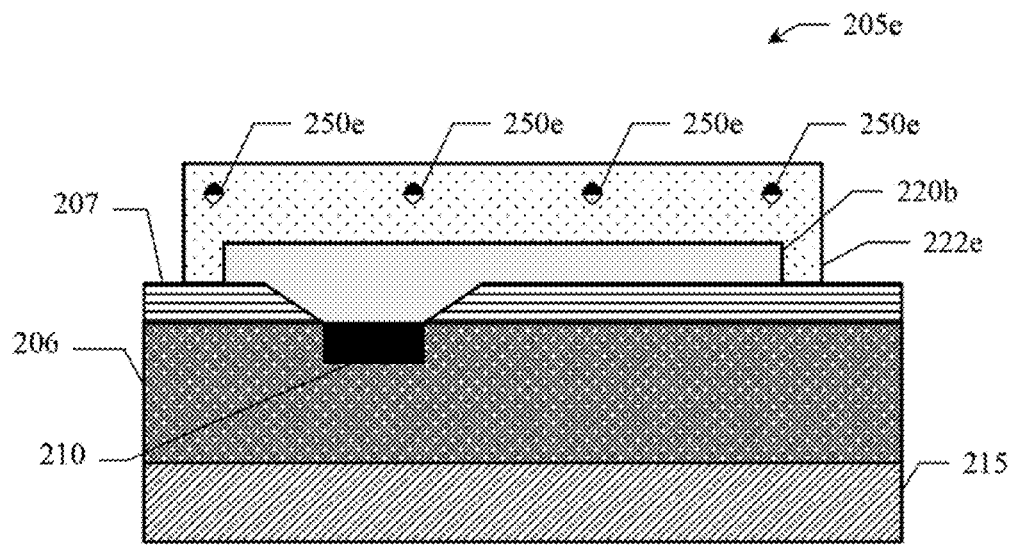

Turning now to FIG. 2E, an electronic circuit 205e again has a similar structure to that shown in FIG. 2B, with the difference that the layer of dielectric material being formed on the metal plate 220b (indicated by the reference 222e) is now provided with metal particles 250e (only four shown in the figure), each one including positive charges (black region) and negative charges (white region).

When a voltage is applied to the metal plate 220b (by the signal to be transmitted), the layer of dielectric material 222e is subject to a corresponding electric field. By electric induction, such electric field rotates the positive and the negative charges of each metal particle 250e along the direction of the electric field; this creates a pseudo-metal plate in addition to the metal plate 220b (which thus may also be omitted, with the layer of dielectric material 222e being in direct contact with the pad 210). Moreover, with high densities of the particles 250e, metal "bridges" (between the metal plates) within the layer of dielectric material 222e may possibly be formed.

An embodiment is advantageous since the properties of signal transmission may be improved by the metal bridges; in particular, in such way it may also be possible to transmit direct signals, such as a supply voltage of the electronic system. Moreover, the presence of the particles 250e may allow compensating a possible misalignment between the metal plate 220b and the other metal plate (not shown in the figure) being placed on the layer of dielectric material 222e.

Figure 2F:
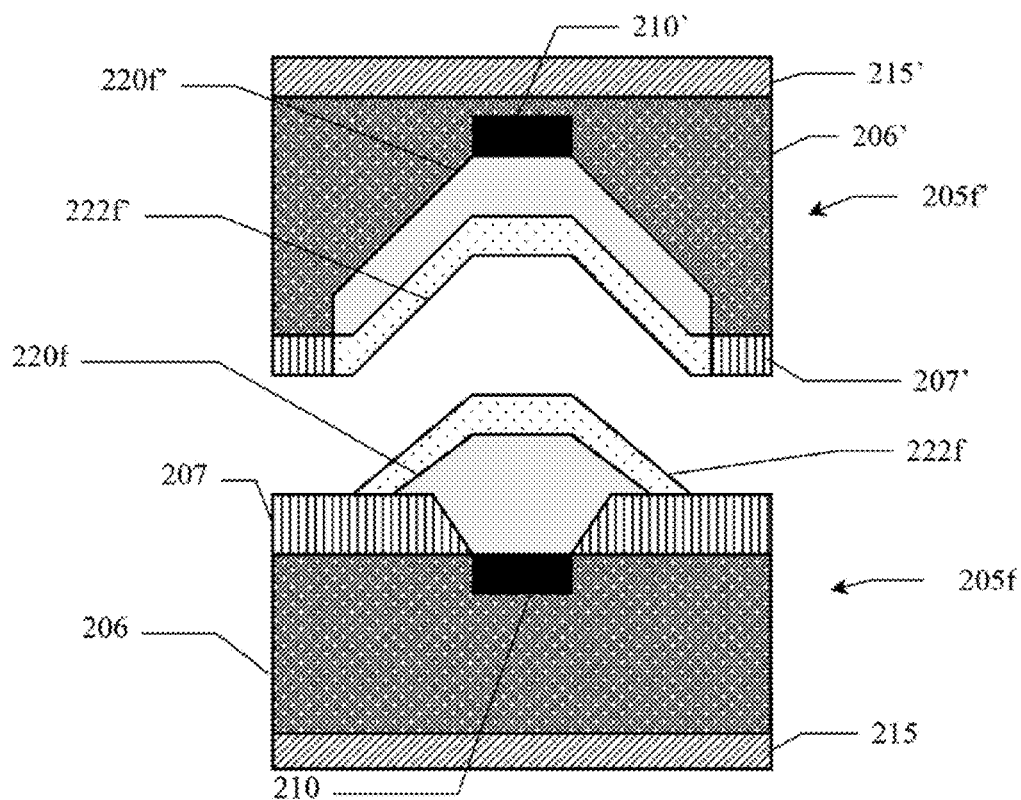

FIG. 2F schematically shows two electronic circuits (indicated by the references 205f, 205f) in cross-section with an implementation of the metal plates according to another embodiment. The electronic circuit 205f again has a similar structure to that shown in FIG. 2B, with the difference that the metal plate and the corresponding layer of dielectric material (indicated by the references 220f and 222f, respectively) have a shape that is complementary to a shape of the other metal plate and the corresponding layer of dielectric material of the electronic circuit 205f (indicated with the references 220f and 222f, respectively In the example in FIG. 2F, the metal plate 220f and the layer of dielectric material 222f of the electronic circuit 205f have a convex trapezoidal shape; such shape may be obtained from the structure being depicted in FIG. 2B by smoothing out the metal plate 220b through a known technique of chemical etching or by forming a bump according to any known technique. The concave trapezoidal structure is obtained by firstly forming a groove in a functional substrate 206' (which is made on a semiconductor substrate 215' and it is covered by a passivation layer 207'), then forming a metal plate 220f within the same groove, and finally depositing the layer of dielectric material 222f onto the metal plate 220f.

It is noted that the concave shape of the metal plate 220f and of the layer of dielectric material 222f is formed within the functional substrate 206'; in this way, a reduction of the encumbrance of the electronic circuit 205f is obtained at the expense of a reduction in the working volume of its functional substrate 206', wherein the connections between the active and/or passive components may be made. In an alternative embodiment (not shown in the figure), the concave trapezoidal shape may be formed outside the functional substrate through deposition of a metal layer and subsequent etching thereof with the final deposition of the layer of dielectric material. In this second case, it is obtained a greater encumbrance of the electronic circuit without affecting the working volume of its functional substrate.

An embodiment is advantageous since, by exploiting mechanically self-centering metal plates, it allows avoiding misalignments between such metal plates that might cause undesired changes of the capacity and hence of the resonance frequency of the resonant LC circuit.

The embodiments being described from FIG. 2A to FIG. 2F do not cover all the possible implementations, because they are only exemplary and not limitative embodiments. Moreover, is understood that such embodiments may be combined with each other, providing further implementations that however fall within the scope of the present disclosure.

Figure 3A:
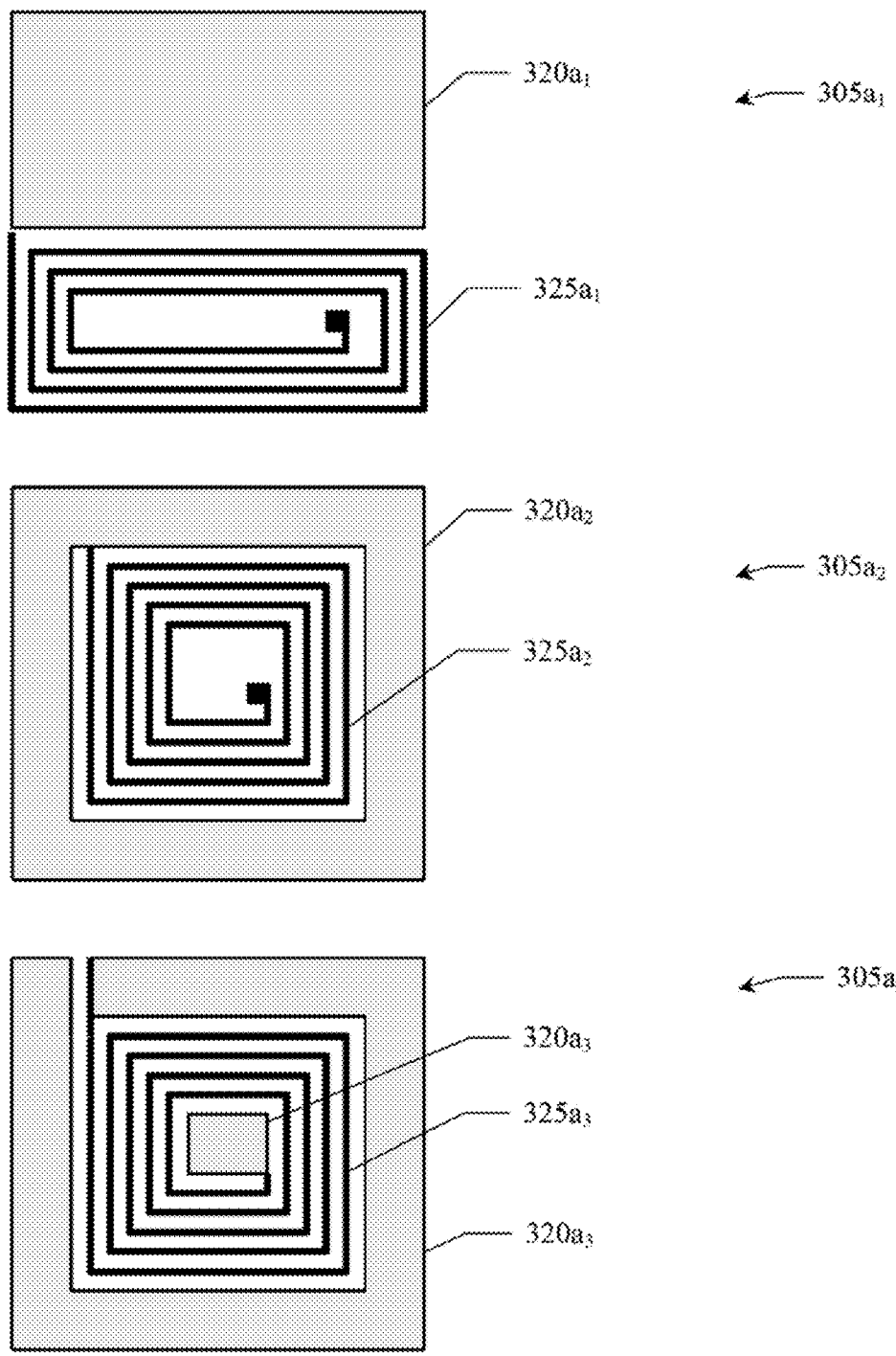

Referring now to FIG. 3A, there are schematically shown different implementations of the metal plate and of the inductor of the resonant LC circuit in top view according to corresponding embodiments. The electronic circuits have a structure being substantially equivalent to that shown in FIG. 2B, with the difference that both the metal plate and the inductor (not visible in the figure) are formed on the passivation layer. What differentiates the three embodiments represented in FIG. 3A is the mutual arrangement of the metal plate and of the inductor (being formed by a winding having a proper number of coils). In a first embodiment of the electronic circuit being indicated with the reference $305a_1$, a metal plate $320a_1$ and an inductor $325a_1$ are put side by side. In a second embodiment of the electronic circuit being indicated with the reference $305a_2$, a metal plate $320a_2$ is around an inductor $325a_2$ (that is, outside its winding). In a third embodiment of the electronic circuit being indicated with the reference $305a_3$, a metal plate $320a_3$ is both around an inductor $325a_3$ and within it; in addition, the metal plate $320a_3$ is shaped like a coil of the inductor $325a_3$. In any case, such shaping may also be used for the metal plate $320a_2$ of the second embodiment.

The embodiment of the electronic circuit $305a_1$ may be usefully implemented by using standard production processes; therefore, such embodiment may be used for making electronic devices having reduced costs.

The embodiments of the electronic devices $305a_2$ and $305a_3$ may be usefully exploited for avoiding unwanted coupling between neighboring electronic circuits; in fact, the metal plate $320a_2$, $320a_3$ around the inductor $325a_2$, $325a_3$ may cause an effect of segregation of its magnetic field.

In addition, the embodiment of the electronic circuit $305a_3$ takes full advantage of the available area, so as to obtain capacitors with higher capacity for the same area occupation, or to reduce the area occupation for the same capacity (thanks to the portion of the metal plate $320a_3$ within the inductor $325a_3$.

Figure 3B:
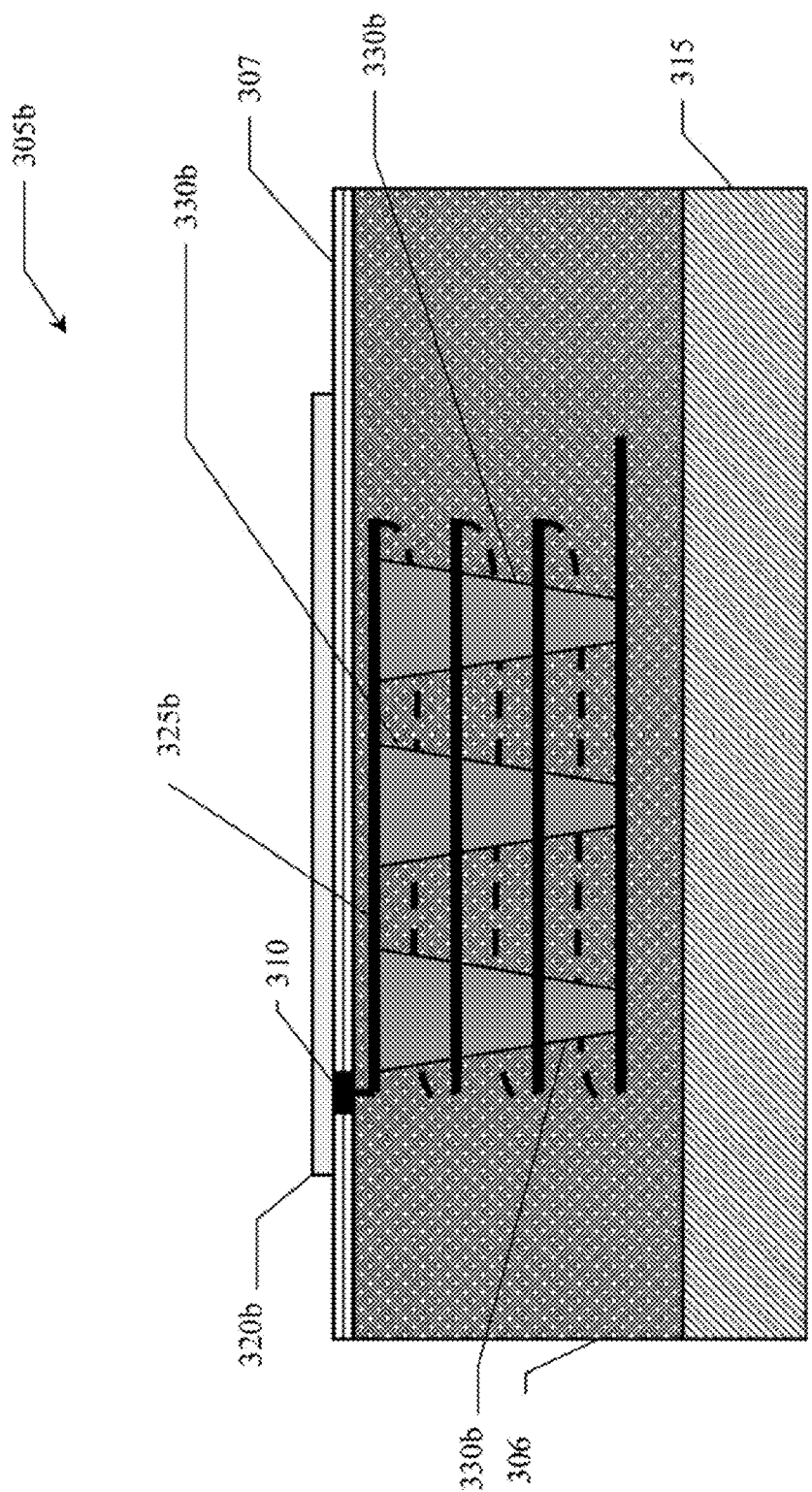

Turning to FIG. 3B, there is schematically shown an embodiment of the electronic circuit in cross-section (indicated by the reference 305b) with an implementation of the metal plate and of the inductor (indicated with the references 320b and 325b, respectively) according to another embodiment. The electronic circuit 305b, having substantially the same structure as that shown in FIG. 2B, has the metal plate 320b being formed on a passivation layer 307; such metal plate 320b is connected to a pad 310 being connected to an inductor 325b, which is formed within the functional substrate 306 being located above the semiconductor substrate 315.

In such an embodiment the inductor 325b may affect the size of the electronic circuit 305b, but this may be reduced by increasing the value of the inductance of the inductor 325b by using, for example, magnetic vias 330b within a winding forming the inductor 325b.

FIG. 4A schematically shows an electronic system 400a according to another embodiment. The electronic system 400a includes the above-described electronic circuit 105a (see FIG. 1A) and another electronic circuit 405a having substantially the same structure (whose components are indicated with the same references but replacing the first digit 1 with the digit 4).

In the electronic system 400a the metal plates 120a and 420a of the electronic circuits 105a and 405a, respectively, are arranged in parallel facing each other, as well as the respective inductors 125a and 425a. In this way, the signal transmission between the two electronic circuits 105a and 405a may occur through the resonant channel being created by the virtual short circuit that is created between the two metal plates 120a and 420a and, at the same time, through the magnetic coupling that, by electromagnetic induction, exists between the inductors 125a and 425a.

An embodiment of exploiting both a capacitive transmission and an inductive transmission may be advantageous since the signal detected by the transceivers 110a, 410a turns out to have an amplitude being greater with respect to the case of the capacitive transmission only; this may lead to a good signal to noise ratio in the phase of acquisition and subsequent processing of the signals.

Figure 4B:
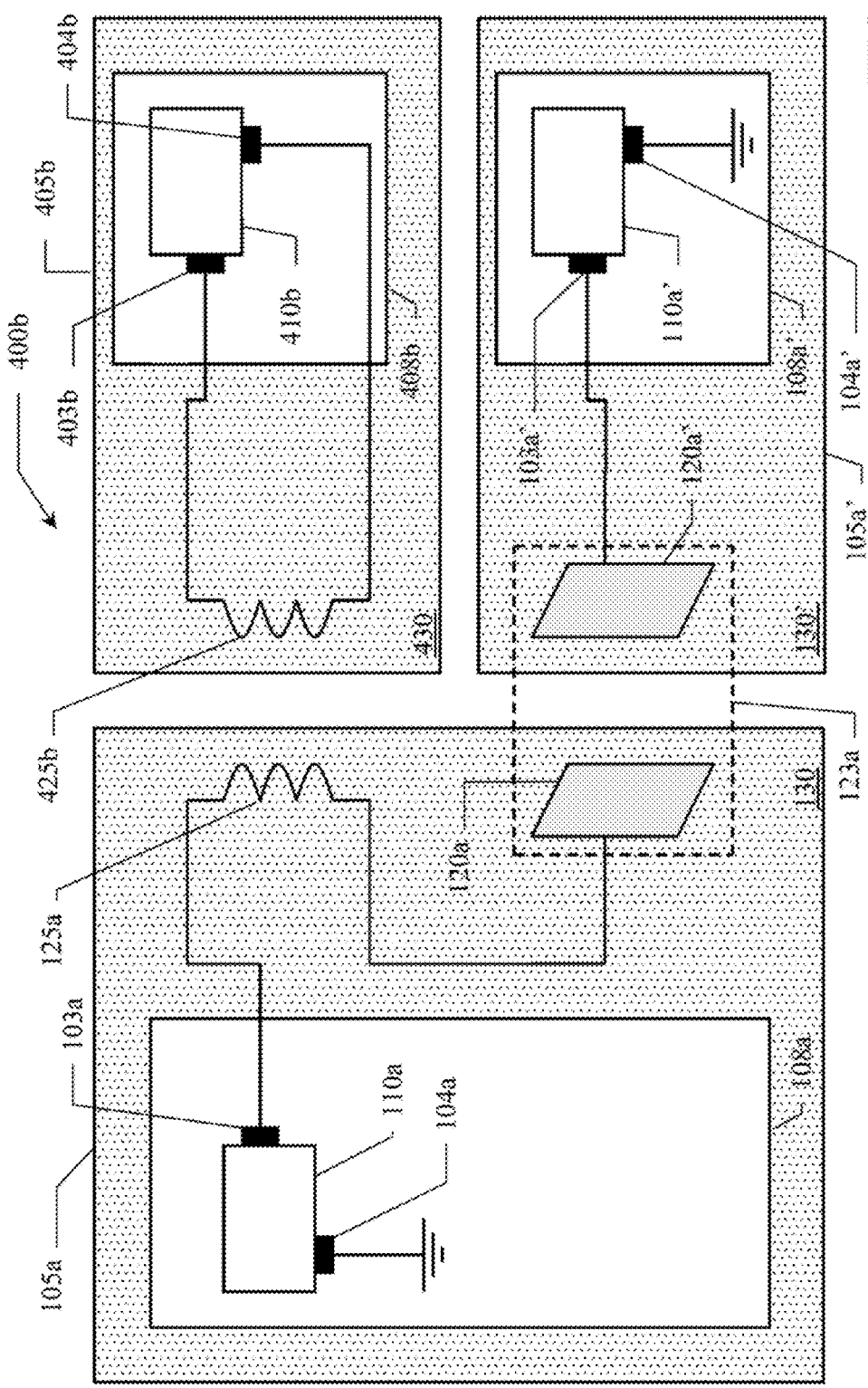

FIG. 4B schematically shows an electronic system 400b according to a further embodiment. The electronic system 400b includes the above-described electronic circuits 105a and 105a' and a further electronic circuit 405b. The electronic circuit 405b includes, as above, a functional region 408b, a transceiver 410b, and terminals 403b, 404b, with the difference that in an area 430 outside the functional region 408b there is formed an inductor 425b (instead of a metal plate) being coupled between the terminals 403b and 404b of the transceiver 410b.

With an embodiment, the electronic circuit 105a may transmit signals simultaneously to the electronic circuit 105a' (by capacitive transmission through the resonant channel between the respective metal plates 120a and 120a') and to the electronic circuit 405b (by inductive transmission because of electromagnetic induction between the respective inductors 125a and 425b), and vice-versa.

Such embodiment may be particularly advantageous since it allows the simultaneous transmission of signals among multiple circuits of the same electronic system in different modes. Moreover, further advantages may be obtained by implementing the embodiments being shown in FIG. 4A and FIG. 4B in differential configuration as described for FIG. 1B.

Figure 5A:
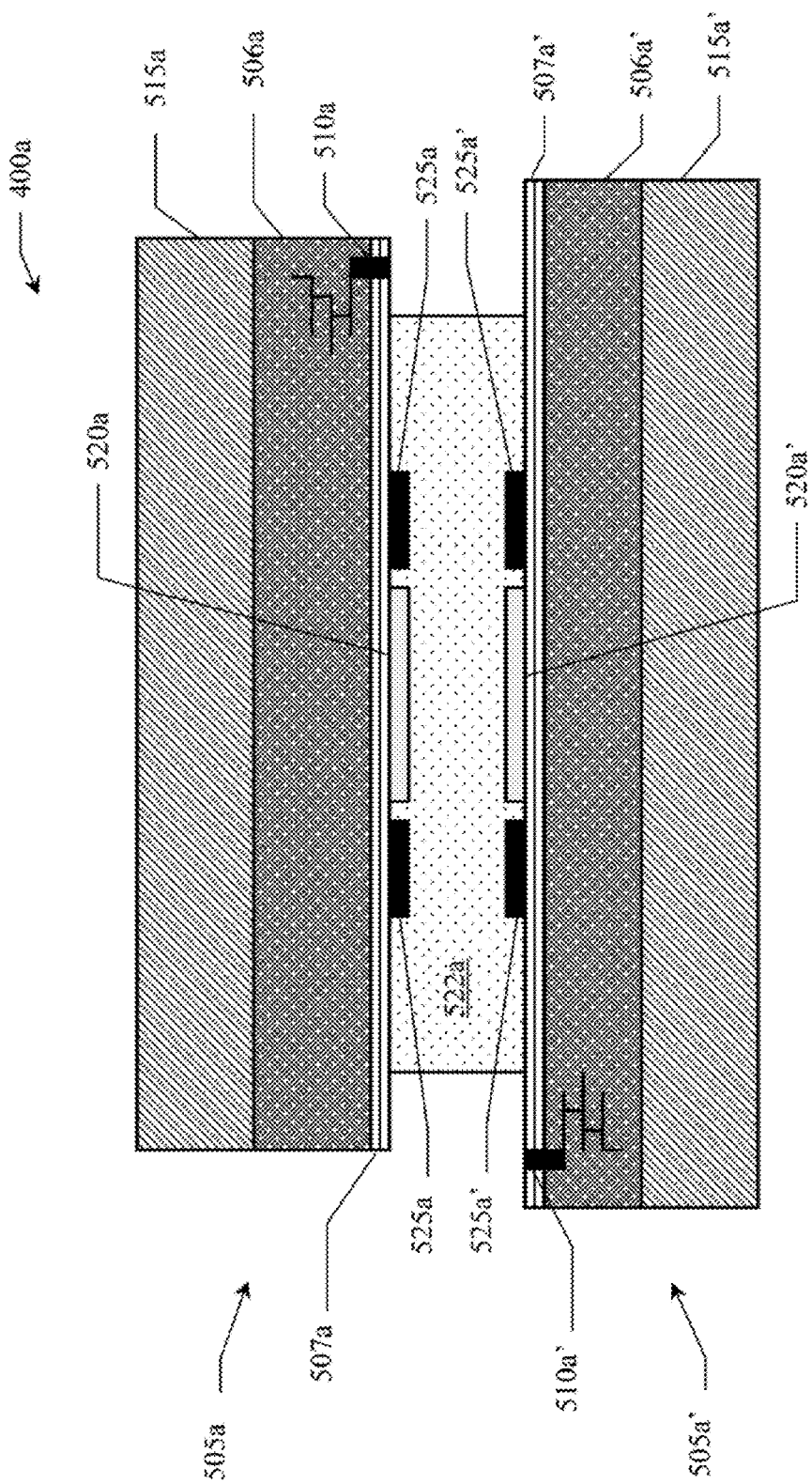

With reference to FIG. 5A, there is schematically shown an implementation of the electronic system 400a according to an embodiment. In such case, the electronic circuits (indicated with the references 505a and 505a') have different sizes. Each electronic circuit 505a, 505a' includes a semiconductor substrate 515a, 515a' on which a functional substrate 506a, 506a' is placed; on the functional substrate 506a, 506a' there is deposited a passivation layer 507a, 507a' in which a pad 510, 510' is formed. On the passivation layer 507a, 507a' of each electronic circuit 505a, 505a' there are formed a metal plate 520a, 520a' and an inductor 525a, 525a' around it. The electronic circuits 505a, 505a' are placed in face-to-face configuration, in which the metal plate 520a and the inductor 525a of the electronic circuit 505a are arranged frontally and parallel to the metal plate 520a' and to the inductor 525a' of the electronic circuit 505a', respectively.

The area included between the passivation layers 507a and 507a' of the electronic circuits 505a and 505a' may be filled with dielectric material 522a for increasing the capacitive coupling. The pads 510a of the electronic circuit 510a and the pads 510a' of the electronic circuit 505a' may be connected to external circuits or to each other by using wires (wire bonds in jargon) or contact bumps.

It may also be possible to have the electronic circuit 505a and the electronic circuit 505a' in a configuration known as face-to-back (not shown in the figure), which differs from the face-to-face configuration because in one of the two electronic circuits the capacitive plate and the inductor are made under the semiconductor substrate. In this case it may be necessary to use at least one metal via (in jargon, Through Silicon Via, or TSV) for connecting the capacitive plate and the inductor to the functional substrate by passing through the semiconductor substrate.

Also other configurations not shown in any figure may be implemented, such as, for example, the back-to-back and back-to-face configurations, even in the differential configuration; moreover, the metal plate may be present above the passivation layer and the inductor may be present under the semiconductor substrate (or vice-versa), and they may be connected to each other through TSVs. Possibly, one of the surfaces of the TSV itself may be used as a capacitor plate.

Figure 5B:
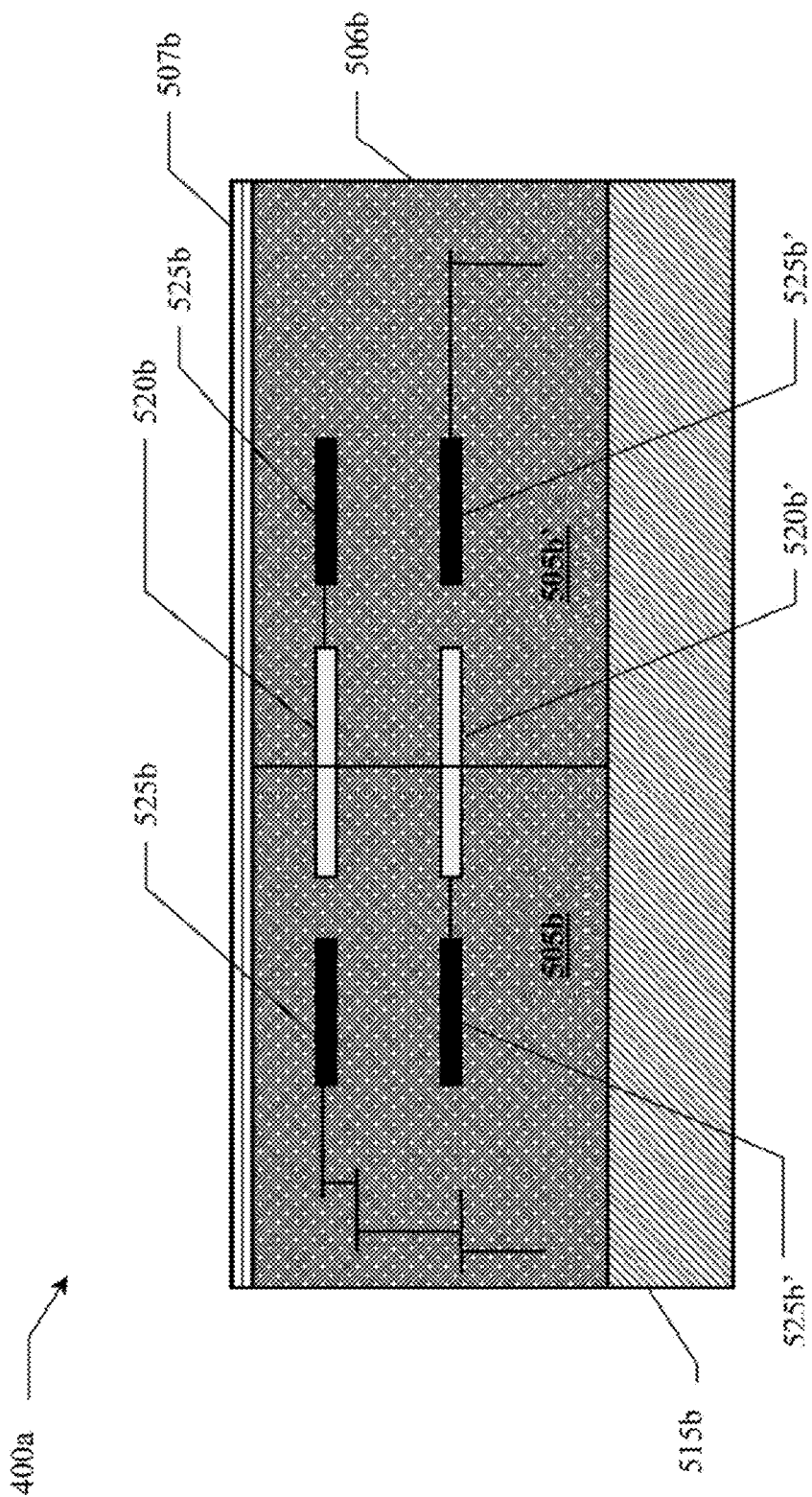

Referring now to FIG. 5B, there is schematically shown an implementation of the electronic system 400a according to another embodiment. In such case, two electronic circuits 505b, 505b' are implemented in insulated areas of a common functional substrate 506b, being arranged on a semiconductor substrate 515b and being covered by a passivation layer 507b. Each electronic circuit 505b, 505b' includes a metal plate 520b, 520b' and an inductor 525b, 525b' that are made within the functional substrate 506b. Naturally, even in this case by implementing a differential configuration the electronic circuits 505b, 505b' may be separated galvanically from each other but may remain capable of communicating with each other.

An embodiment may be advantageous since it does not require the assembly of two different electronic circuits and it does not require any further layer of dielectric material; in fact, it may be possible to use at least one oxide layer being already present in the functional substrate 506b, which acts as insulator between the metal plates 520b, 520b' and the inductors 525b and 525b'.

These and other implementations (even hybrid ones), possibly with proper modifications, may be applied to make other electronic systems that exploit the wireless signal transmission, such as, for example, the electronic system of FIG. 4B.

Naturally, in order to satisfy local and specific requirements, one may apply to the embodiments described above many logical and/or physical modifications and alterations. More specifically, although embodiments have been described with a certain degree of particularity, it is understood that various omissions, substitutions and changes in the form and details as well as other embodiments are possible. In particular, the same embodiments may even be practiced without the specific details set forth in the preceding description for providing a more thorough understanding thereof; on the contrary, well known features may have been omitted or simplified in order not to obscure the description with unnecessary particulars. Moreover, it is expressly intended that specific elements and/or method steps described in connection with any disclosed embodiment may be incorporated in any other embodiment as a matter of general design choice.

For example, similar considerations apply if the electronic circuits have a different structure or include equivalent components (either separated from each other or combined together, in whole or in part); in particular, it may be possible to provide that the electronic circuits are included in different packages.

Similar considerations may apply if the second metal plate is formed by distinct metal plates, each one being coupled with different electronic circuits or different functional blocks of a same electronic circuit.

Nothing prevents coupling the first metal plate with different inductors (for example, being connected to each other through series, parallel, T, or Y connections, and/or through any other useful possible combination thereof) for creating multiple resonant channels with different electronic circuits and/or with different functional blocks of a same electronic circuit. In this case, each resonant channel will turn out to be active in correspondence to a signal having the specific resonance frequency for the given channel.

The same considerations may apply if at least partly variable inductors and/or capacitors are used for properly modifying the resonance frequencies, for example, for compensating any fluctuations in the resonant frequencies being due to parasitic effects or production imperfections. Proper circuits, some of which may be, for example, gyrators (possibly similar to the Antoniou circuit), may be used for emulating a variable inductance, such as being capable of maximizing the system performance according to at least one electrical parameter being measured by such circuits. Instead of changing the inductance, suitable circuits (for example, a programmable frequency oscillator) may be used for varying the frequency according to the resonant circuit and the imperfections thereof, thereby allowing maximizing the transmitted power through proper adaptive algorithms being applied by control circuits that measure at least one parameter of the transmitted and received signal. At high-frequency the generic inductor may be replaced by a proper transmission line whose effect and functionality are, however, equivalent thereto.

Nothing prevents forming the first metal plate by a plurality of metal plates, each one being coupled, through a corresponding plurality of inductors, with a corresponding plurality of electronic circuits or functional blocks of a same electronic circuit.

Similar considerations may apply if the metal plates have shapes being optimized as a function of their area occupation, such as, for example, rhomboidal ones, or if the metal plates are not plane and parallel, but, for example, coaxial cylindrical or concentric spherical ones.

Moreover, nothing prevents making the first capacitive plate inside and/or outside the coils of the inductor of a metal that, at the resonance frequency, has ferromagnetic properties (for example, magnetic permeability greater than 10), such as, for example, nickel and its alloys or cobalt and its alloys, in order to increase the inductance of the inductor.

Nothing prevents making the resonant LC circuit (or part thereof) within the passivation layer or below it; moreover, nothing prevents making the resonant LC circuit (or part thereof) within an oxide layer or of another material.

The same considerations may apply if the dielectric layer between the first metal plate and the second metal plate is not present, for example, by exploiting a fluid (for example, the air) being interposed between the two plates as dielectric The same considerations may apply if the conductive particles are not within the layer of dielectric material but in the passivation layer (for example, in case that, in order to reduce the area occupation, there becomes necessary to remove the layer of dielectric material and to use the existing passivation layer as dielectric).

Moreover, the same considerations may apply if the first capacitive plate and the second capacitive plate have a more complex profile, such as sawtooth-like.

Nothing prevents having the capacitive plates not around the respective inductors, but, for example, only within them.

Similar considerations may apply if the electronic circuits are provided with further metal plates to be used, for example, in dummy mode for obtaining a mechanical self-alignment of the first and second metal plates.

Furthermore, in all the described embodiments wherein it is desired to perform the simultaneous transmission of signals among multiple circuits in different modes (i.e., capacitively and inductively), such a transmission may be implemented in different ways according to corresponding specific requirements. For example, alternatively to the possibility (previously described) of using the signal at approximately the resonant frequency to be transmitted both capacitively and inductively, the signal may spread over a frequency range around the resonant frequency; in this way, each frequency of the range may be properly used for a corresponding transmission, as a sort of "dedicated communication channel". Additionally or alternatively, it may also be possible to provide the use of different signals to be transmitted in an alternated way with respect to each other, for example, by using a signal for a capacitive transmission with a corresponding circuit followed by another signal for an inductive transmission to another corresponding circuit (or vice versa). Also for the latter case, the frequencies of the alternated signals may be approximately equal to each other (and approximately equal to the resonant frequency) or different to each other (but however within a proper frequency range around the resonant frequency for avoiding any excessive loss of intensity of the transmitted signal).

The proposed embodiments might be part of the design of an integrated circuit. The design may also be created in a programming language; moreover, if the designer does not fabricate chips or masks, the design may be transmitted by physical means to others. In any case, the resulting integrated circuit may be distributed by its manufacturer in raw wafer form, as a bare die, or in packages. Moreover, the proposed embodiments may be integrated with other circuits in the same chip, or it may be implemented in intermediate products, such as PCBs (Printed Circuit Boards) or on a generic substrate (for example, of the ceramic type), and coupled with one or more other chips (such as a processor or a memory). In any case, the integrated circuit may be suitable to be used in complex systems (such as computers).

In addition, the metal plate and/or the inductor may also be made outside the integrated circuit—for example, on a PCB or on a generic substrate (for example, of the ceramic type), together with the possible dielectric layer either including or not metal particles. For example, this may be useful for creating interfaces for the test of the described electronic circuits.

The proposed structure may be part of the design of an integrated system. The design may also be created in a programming language; moreover, if the designer does not manufacture the electronic system or the masks, the design may be transmitted by physical means to others. In any case, the resulting integrated system may be distributed by its manufacturer in raw wafer form, as a bare die, or in packages. Moreover, the proposed structure may be integrated with other circuits and in the same chip, or it may be mounted in intermediate products (such as mother boards) and coupled with one or more other chips (such as a processor). In any case, the integrated system may be suitable to be used in complex systems (such as automotive applications or microcontrollers).

Moreover, embodiments of the described electronic circuits may be implemented and sold separately.

Furthermore, an embodiment may lend itself to be implemented through an equivalent method (by using similar steps, removing some steps being not essential, or adding further optional steps); moreover, the steps may be performed in a different order than discussed above, concurrently, or in an interleaved way (at least partly).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:
1. A system, comprising:
 a first apparatus including:
  a first electronic circuit having a first signal node;
  a first conductive electrode in the first electronic circuit and electrically coupled to the first signal node; and
  a first inductor serially coupled between the first signal node and the first conductive electrode; and
 a second apparatus including:
  a second electronic circuit having a second signal node and a second conductive electrode that is electrically coupled to the second signal node and capacitively coupled with the first conductive electrode to form a first capacitor with the first conductive electrode; and
  a third electronic circuit having third and fourth signal nodes and a second inductor coupled across the third and fourth signal nodes and arranged in parallel facing the first inductor to be inductively coupled with the first inductor; and
 wherein the first electronic circuit is configured to transmit signals simultaneously from the first electronic circuit to the second and third electronic circuits.

2. The system of claim 1, wherein the signal comprises a power signal.

3. The system of claim 1, wherein the signal comprises a data signal.

4. A system, comprising:
a first apparatus including:
a first electronic circuit having a first signal node;
a first conductive electrode in the first electronic circuit and electrically coupled to the first signal node; and
a first inductor serially coupled between the first signal node and the first conductive electrode; and
a second apparatus including:
a second electronic circuit having a second signal node; and
a second conductive electrode electronically coupled to the second signal node and forming a first capacitor with the first conductive electrode; and
a third electronic circuit having a third and fourth signal node; and
a second inductor coupled between the third and fourth signal node and arranged relative to the first inductor to be inductively coupled with the first inductor;
wherein a first signal is transmitted between the first electronic circuit and the third electronic circuit through the inductive coupling between the first and second inductors; and
wherein a second signal is transmitted between the first electronic circuit and the second electronic circuit through the capacitive coupling of the first capacitor.

5. The system of claim 4, wherein at least one of the first and second signals comprises a power signal.

6. The system of claim 4, wherein at least one of the first and second signals comprises a data signal.

7. The system of claim 4, wherein the first and second apparatuses are disposed on a same integrated-circuit die.

8. The system of claim 4, wherein the first and second apparatuses are disposed on respective integrated-circuit dies.

9. The system of claim 4, wherein the first and second apparatuses are disposed on a same substrate.

10. The system of claim 9, wherein the substrate comprises a semiconductor substrate.

11. The system of claim 10, wherein the substrate comprises a printed circuit board.

12. The system of claim 4, wherein the first and second apparatuses are disposed on respective substrates.

13. A method, comprising:
generating an electronic signal in a first electronic circuit including a first inductive circuit and a first capacitive circuit;
magnetically transmitting the electronic signal through the first inductive circuit to a second inductive circuit in second electronic circuit;
capacitively transmitting the electronic signal through the first capacitive circuit to a second capacitive circuit in a third electronic circuit;
transmitting the electronic signal approximately simultaneously from the first electronic circuit to the second and third electronic circuits through the magnetic and capacitive transmissions,
wherein transmitting the electronic signal approximately simultaneously comprises transmitting the electronic signal through a resonant channel created by capacitive and inductive circuits; and
wherein generating the electronic signal includes generating the electronic signal having a resonant frequency that defines the resonant channel, the resonant frequency having a value based on characteristics of the first capacitive and inductive circuits and the second capacitive and inductive circuits.

14. The method of claim 13, wherein generating the electronic signal comprises generating a power signal.

15. The method of claim 14, wherein generating the electronic signal comprises generating a data signal.

* * * * *